US007262364B2

(12) United States Patent
Jonscher et al.

(10) Patent No.: US 7,262,364 B2
(45) Date of Patent: Aug. 28, 2007

(54) CABLE COUPLER CLAMP ASSEMBLY

(75) Inventors: John E. Jonscher, North Olmsted, OH (US); Gregory Gut, Westfield Center, OH (US)

(73) Assignee: Adalet/Scott Fetzer Company, Cleveland, OH (US)

( * ) Notice: Subject to any disclaimer, the term of this patent is extended or adjusted under 35 U.S.C. 154(b) by 0 days.

(21) Appl. No.: 11/342,407

(22) Filed: Jan. 30, 2006

(65) Prior Publication Data

US 2007/0175651 A1 Aug. 2, 2007

(51) Int. Cl.
*H02G 15/06* (2006.01)

(52) U.S. Cl. .......................................................... 174/91

(58) Field of Classification Search .................. 174/91, 174/94 S; 439/362

See application file for complete search history.

(56) References Cited

U.S. PATENT DOCUMENTS 1,103,130 A * 7/1914 Cunningham et al. ........ 178/45
2,242,271 A * 5/1941 Spiro ...................... 200/253.1
2,369,860 A 2/1945 Schroeder
3,157,450 A 11/1964 Harrison, Sr. et al.
4,682,847 A 7/1987 Moore et al.
4,840,574 A 6/1989 Mills
5,611,703 A 3/1997 Okamoto et al.
5,873,745 A 2/1999 Duclos et al.

* cited by examiner

*Primary Examiner*—Chau N. Nguyen
(74) *Attorney, Agent, or Firm*—Jones Day

(57) ABSTRACT

An electrical cable coupler shell has first and second halves with open end portions configured for telescopic movement along an axis. A first clamp structure is located on the first shell half. A second clamp structure is located on the second shell half. A third clamp structure is receivable in screw threaded engagement with the first clamp structure for movement axially and rotationally relative to the first shell half. The third clamp structure is configured to engage the second clamp structure so as to rotate relative to the second shell half, and simultaneously to impart axial movement to the second shell half, upon moving axially and rotationally in screw threaded engagement with the first clamp structure.

9 Claims, 8 Drawing Sheets

CABLE COUPLER CLAMP ASSEMBLY

TECHNICAL FIELD

This technology relates to couplers for electrical cables.

BACKGROUND

An electrical cable coupler has plug and socket portions on the ends of a pair of electrical cables. Power circuit contacts in the plug are engaged with power circuit contacts in the socket to close a power circuit through the coupler when the plug is inserted in the socket. Safety circuit contacts also are engaged with each other to close a safety circuit through the coupler when the plug is inserted in the socket. In the case of a high voltage mining coupler, a time delay is required between disengagement of the safety contacts and disengagement of the power circuit contacts when the plug is removed from the socket.

SUMMARY

An electrical cable coupler shell has first and second halves with open end portions configured for telescopic movement along an axis. A first clamp structure is located on the first shell half. A second clamp structure is located on the second shell half. A third clamp structure is receivable in screw threaded engagement with the first clamp structure for movement axially and rotationally relative to the first shell half. The third clamp structure is configured to engage the second clamp structure so as to rotate relative to the second shell half, and simultaneously to impart axial movement to the second shell half, upon moving axially and rotationally in screw threaded engagement with the first clamp structure.

Preferably, the first clamp structure comprises a screw threaded bolt mounted on the first shell half, and the third clamp structure comprises a nut that is screwed onto the bolt. The nut is movable axially against the second clamp structure upon rotating on the bolt.

DETAILED DESCRIPTION

Figure 1:
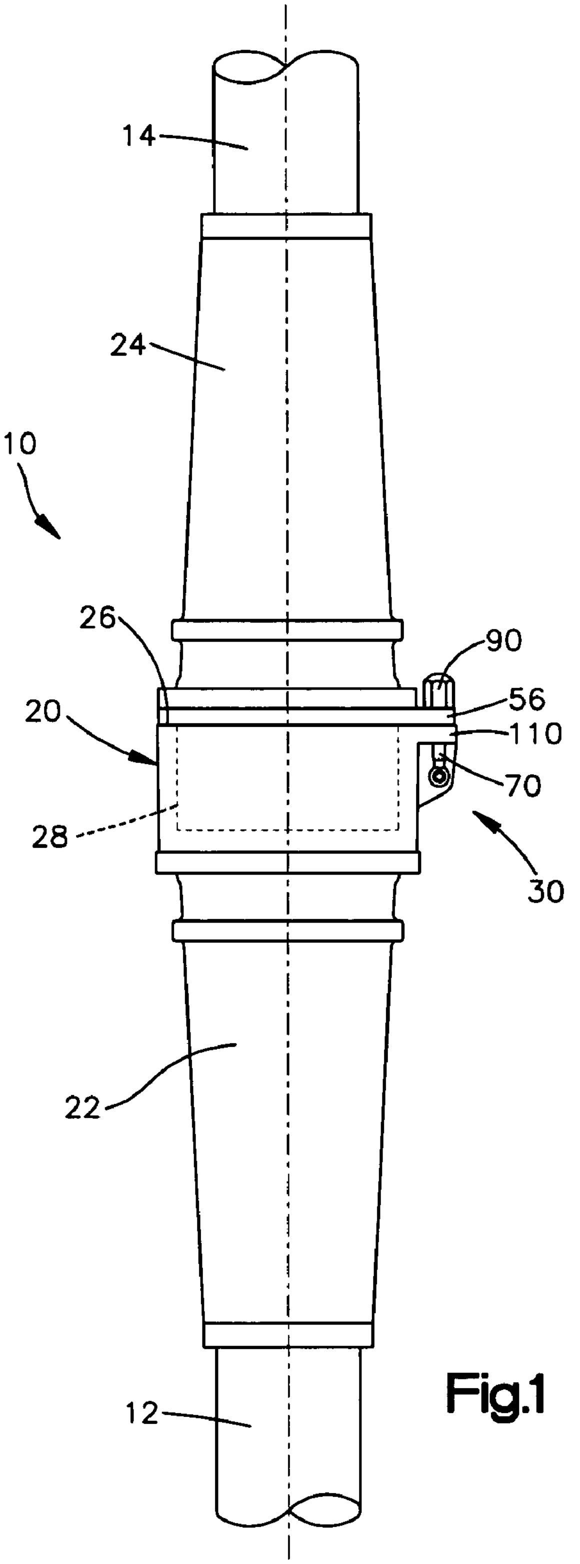
FIG. 1 is a view of an electrical cable coupler with a clamp assembly constructed in accordance with the claimed invention.

The apparatus shown in the drawings has parts that are examples of the elements recited in the claims. The following description thus includes examples of how a person of ordinary skill in the art can make and use the claimed invention. It is presented here to meet the statutory requirements of written description, enablement, and best mode without imposing limitations that are not recited in the claims.

The apparatus shown in FIG. 1 is a high voltage mining coupler 10 for a pair of electrical cables 12 and 14. The coupler 10 includes a shell 20 with first and second halves 22 and 24 that are mounted on the ends of the cables 12 and 14. The first shell half 22 in this example has an open end portion configured as a socket 26. The second shell half 24 in this example has an open end portion configured as a plug 28.

Each shell half 22 and 24 contains both power circuit contacts and safety circuit contacts. When the plug 28 is being moved into the socket 26, the power circuit contacts move into engagement before the safety circuit contacts move into engagement. When the plug 28 is being withdrawn from the socket 26, the power circuit contacts remain in engagement until after the safety circuit contacts are moved out of engagement. The contacts, which are omitted from the drawings for clarity of illustration, may have any suitable configuration known in the art.

The coupler 10 further includes a clamp assembly 30. In addition to clamping the two shell halves 22 and 24 together, the clamp assembly 30 is operative to release the plug 28 from the socket 26 in a gradual manner that provides a time delay between disengagement of the safety circuit contacts and disengagement of the power circuit contacts.

Figure 2:
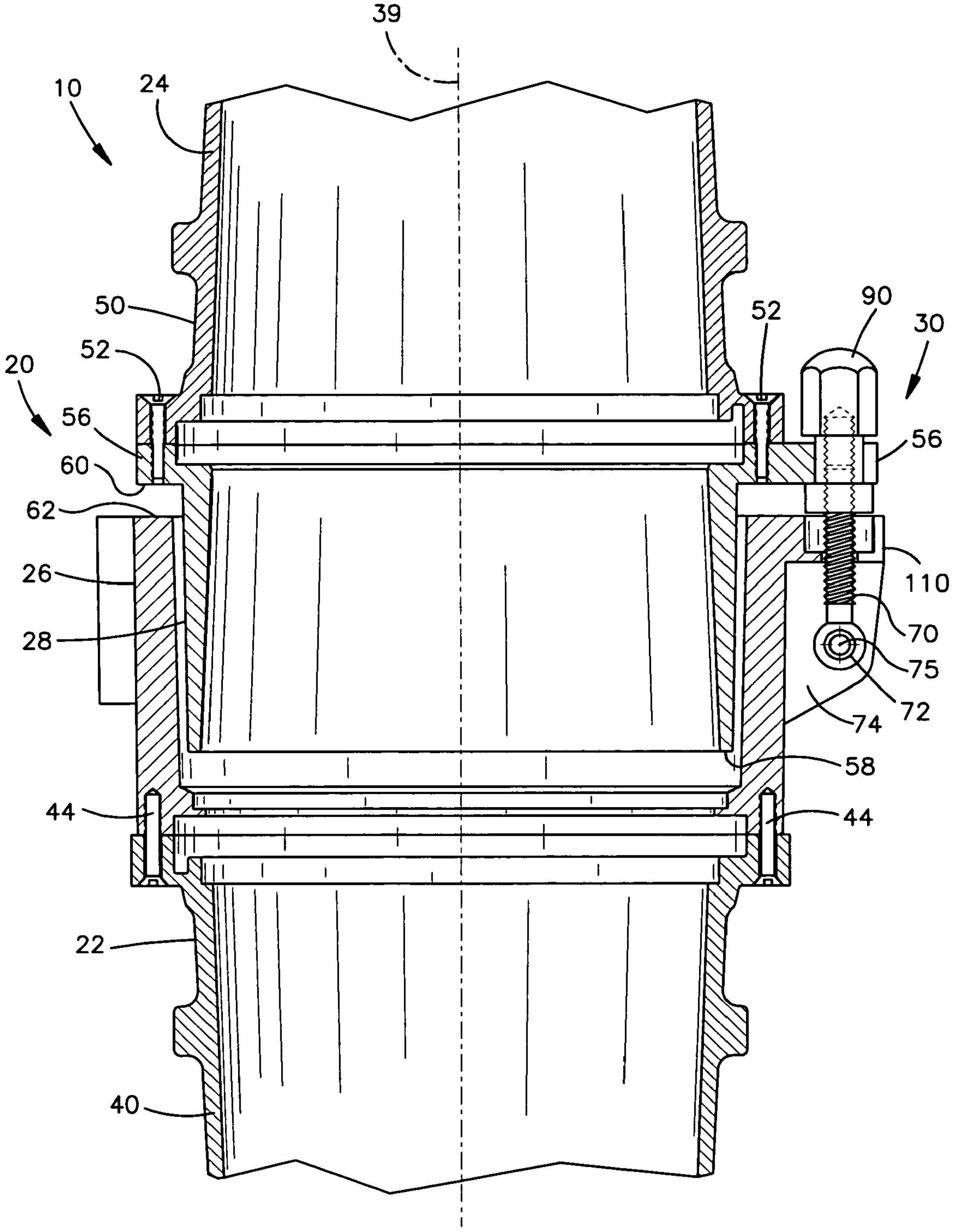
FIG. 2 is an enlarged sectional view of parts shown in FIG. 1.

As shown separately in FIG. 2, the shell 20 has a longitudinal central axis 39 along which the plug 28 and the socket 26 are movable telescopically. In the illustrated example, the first shell half 22 has a generally conical portion 40 centered on the axis 39. The socket portion 26 of the first shell half 22 is a generally cylindrical part that also is centered on the axis 39, and is fixed to the conical portion 40 by machine screws 44.

Like the first shell half 22, the second shell half 24 in this example has a generally conical portion 50 centered on the axis 39. The plug portion 28 of the second shell half 24 is a generally cylindrical part that is fixed coaxially to the body portion 50 by machine screws 52. A flange 56 projects radially outward at a location spaced axially from the inner end 58 of the plug 28. An inner side surface 60 of the flange 56 is perpendicular to the axis 39 and faces toward the inner end 58. The inner side surface 60 is movable toward and against an opposed end surface 62 on the socket 26 upon movement of the plug 28 into the socket 26.

Figure 3:
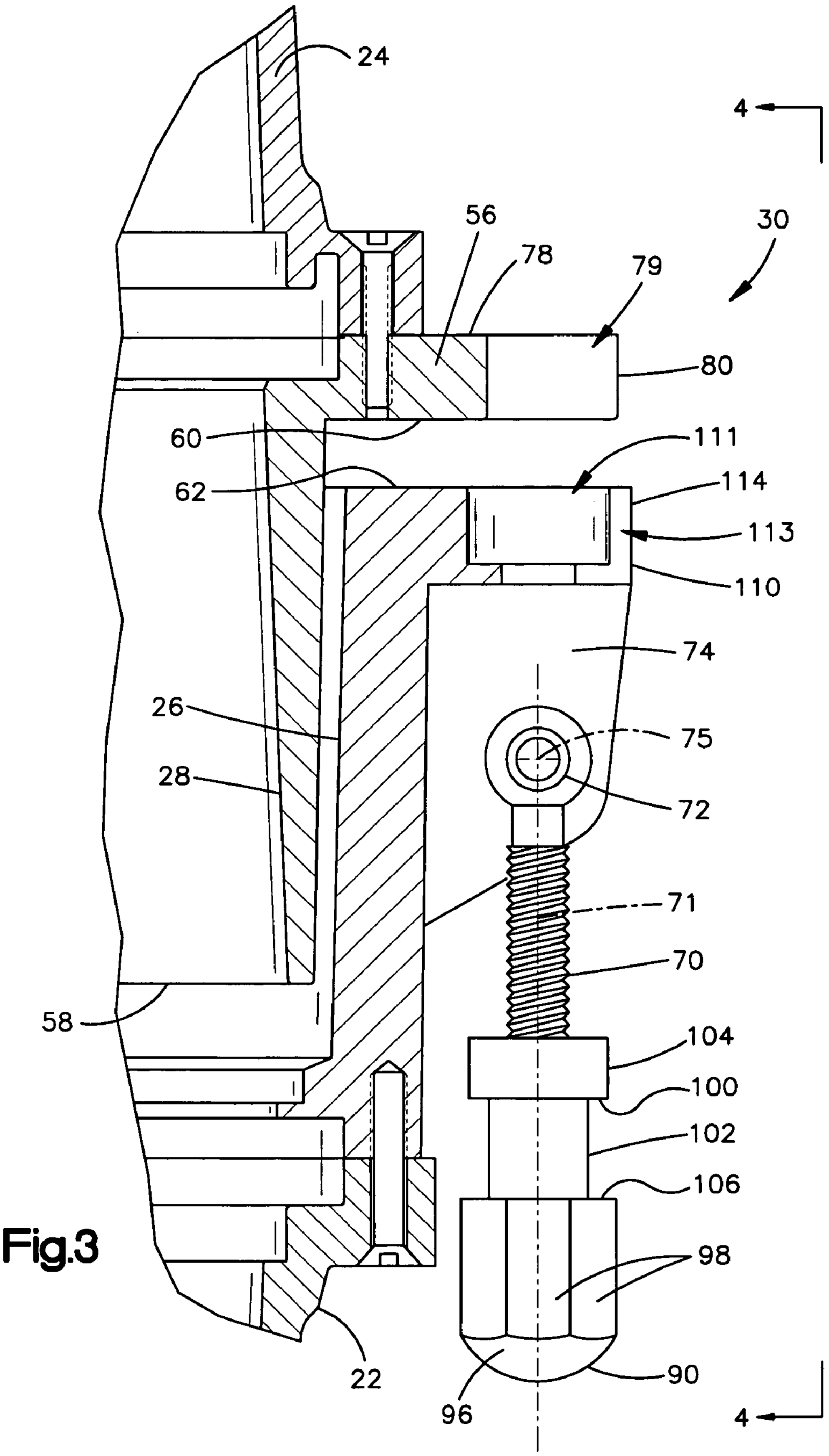
FIG. 3 is a further enlarged view of parts shown in FIG. 2.
Figure 4:
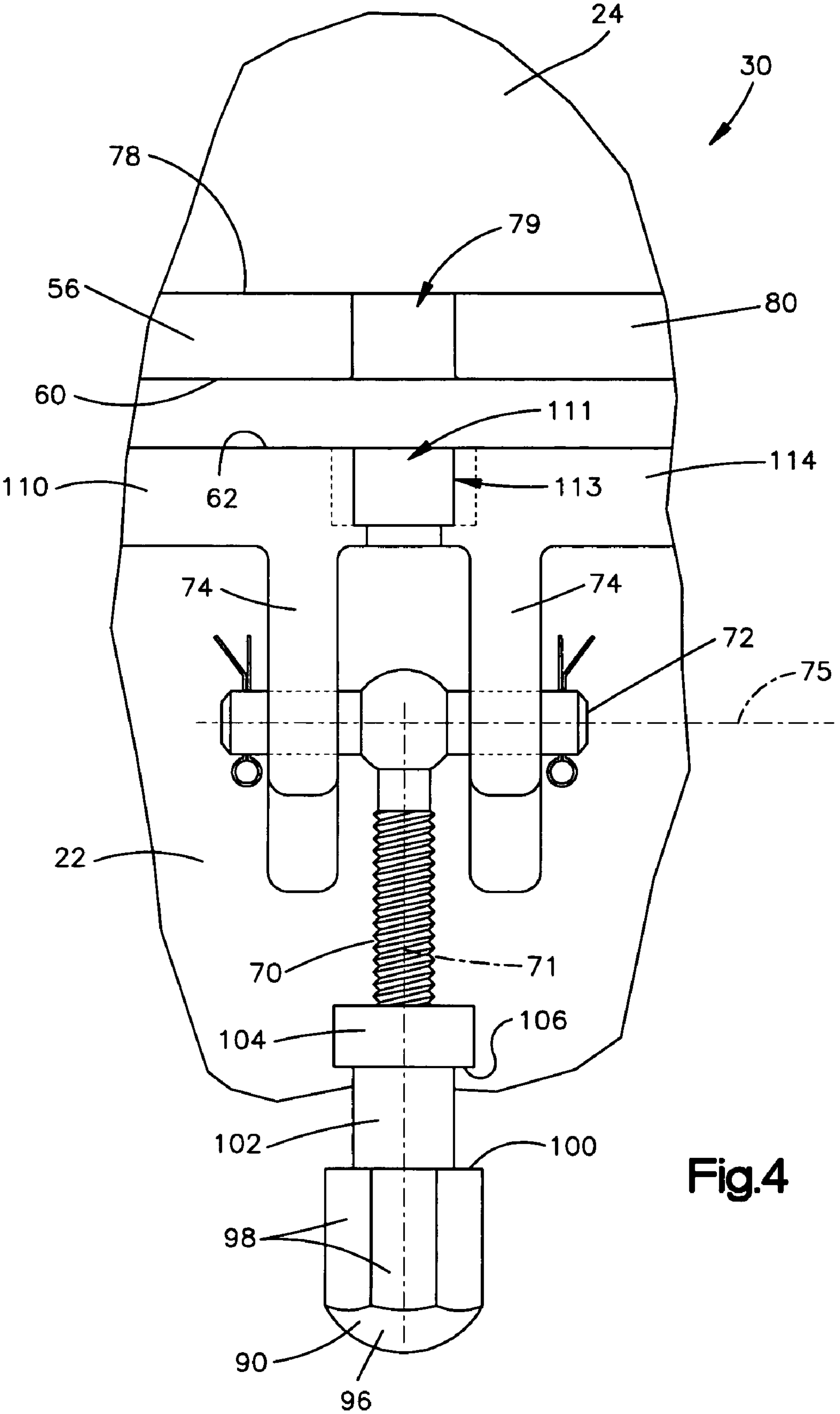
FIG. 4 is a view taken on line 4-4 of FIG. 3.

The clamp assembly 30 includes four distinct clamp structures. The first clamp structure is a screw-threaded bolt 70 that is mounted on the first shell half 22. As shown in FIGS. 3 and 4, the bolt 70 has a longitudinal axis 71 and is mounted on a pivot pin 72. A pair of brackets 74 on the first shell half 22 support the pin 72 for rotation about an axis 75 perpendicular to the central axis 39 (FIG. 2). In this arrangement, the bolt 70 is supported on the first shell half 22 for movement pivotally about that axis 75 between the positions shown in FIGS. 2 and 3.

The second clamp structure is a portion of the flange 56 on the second shell half 24. As best shown in FIGS. 3 and 4, the flange 56 has an outer side surface 78 facing oppositely relative to the inner side surface 60. An open slot 79 extends radially inward from the peripheral surface 80 of the flange 56 and defines a passage extending axially through the flange 56.

Figure 5:
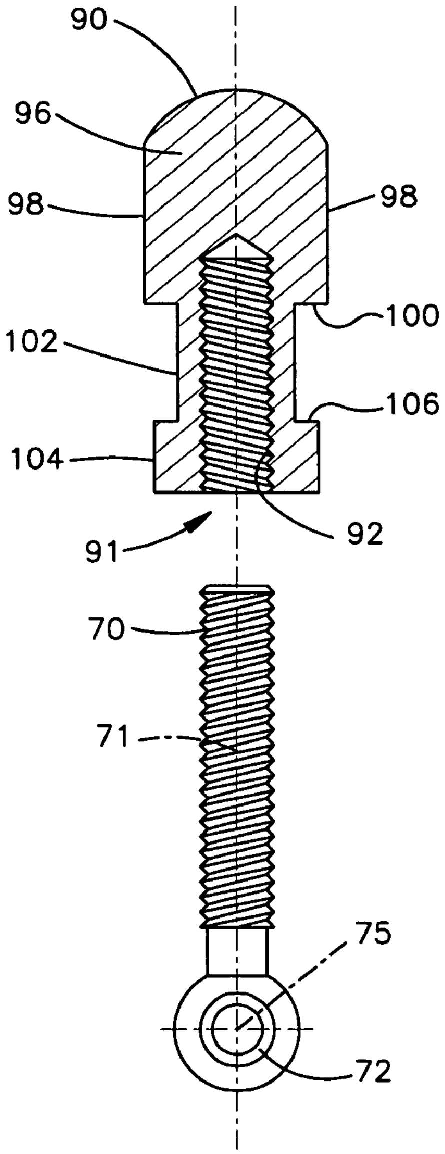
FIG. 5 is an exploded view of parts shown in FIG. 3.

The third clamp structure is a nut 90 that is screwed onto the bolt 70. As shown in FIG. 5, the nut 90 has a blind bore 91 with an internal screw thread 92. A head portion 96 of the nut 90 has flats 98 for gripping by a driving tool, and has a ring-shaped shoulder surface 100 perpendicular to the axis 71. A narrow intermediate section 102 of the nut 90 extends axially from the head 96 to a wider cylindrical base 104. The diameter of the intermediate section 102 is just slightly less than the width of the slot 79 in the flange 56 (FIGS. 3 and 4). The length of the intermediate section 102 is just slightly greater than the thickness of the flange 56. A ring-shaped shoulder surface 106 on the base 104 of the nut 90 also is perpendicular to the axis 71, and faces axially past the intermediate section 102 toward the opposed shoulder surface 100 on the head 96.

The fourth clamp structure is part of a flange 110 on the first shell half 22. The end surface 62 on the first shell half 22 projects radially outward onto the flange 110, as shown in FIGS. 3 and 4. A passage with a counterbore 111 extends fully through the flange 110 in a direction parallel to the central axis 39. A slot 113 extends radially outward from the passage 111 to the peripheral surface 114 of the flange 110. The width of the slot 113 is greater than the diameter of the bolt 70, but is less than the diameter of the base portion 104 of the nut 90.

Figure 7:
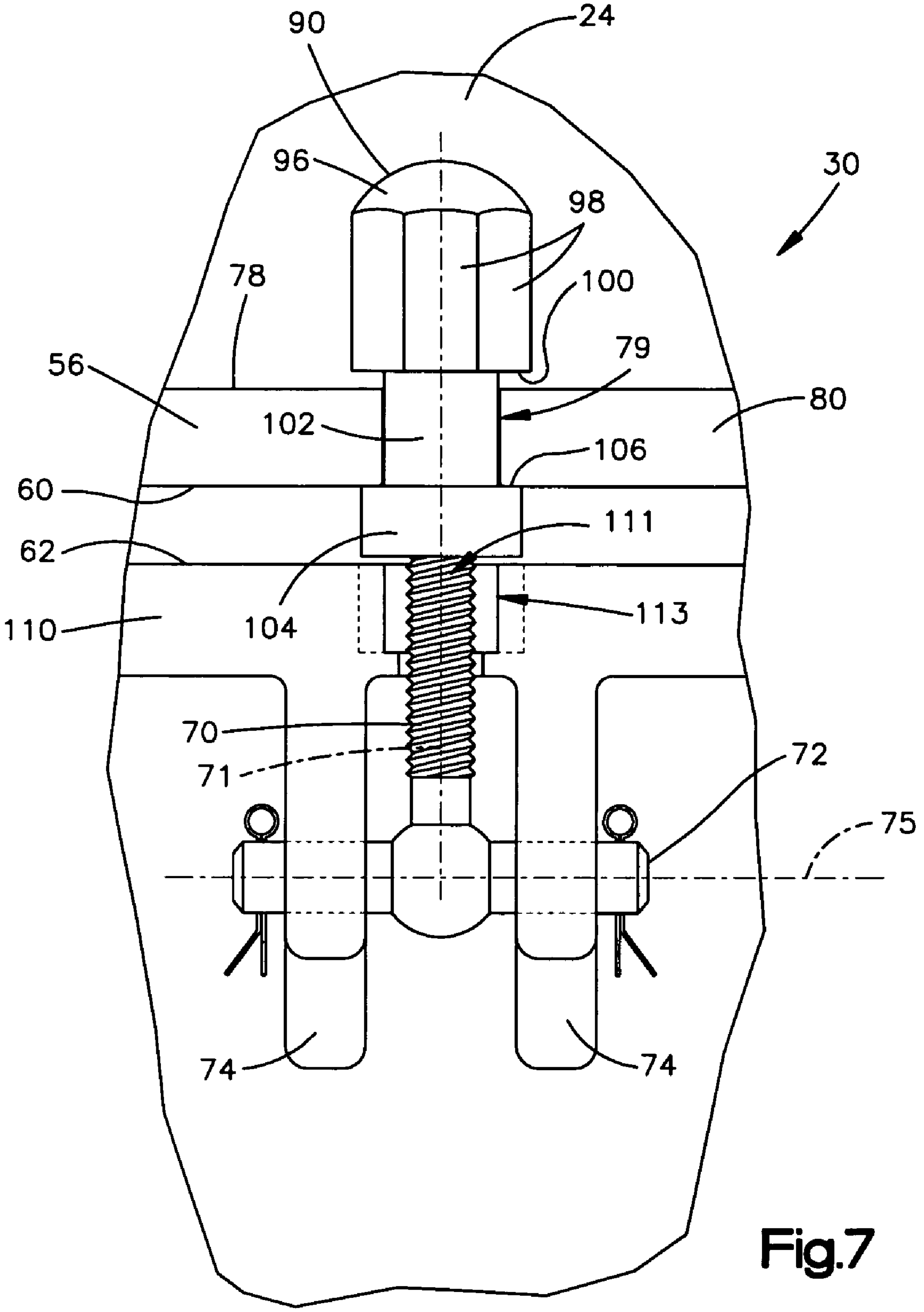
FIG. 7 is a view taken on line 7-7 of FIG. 6.
Figure 8:
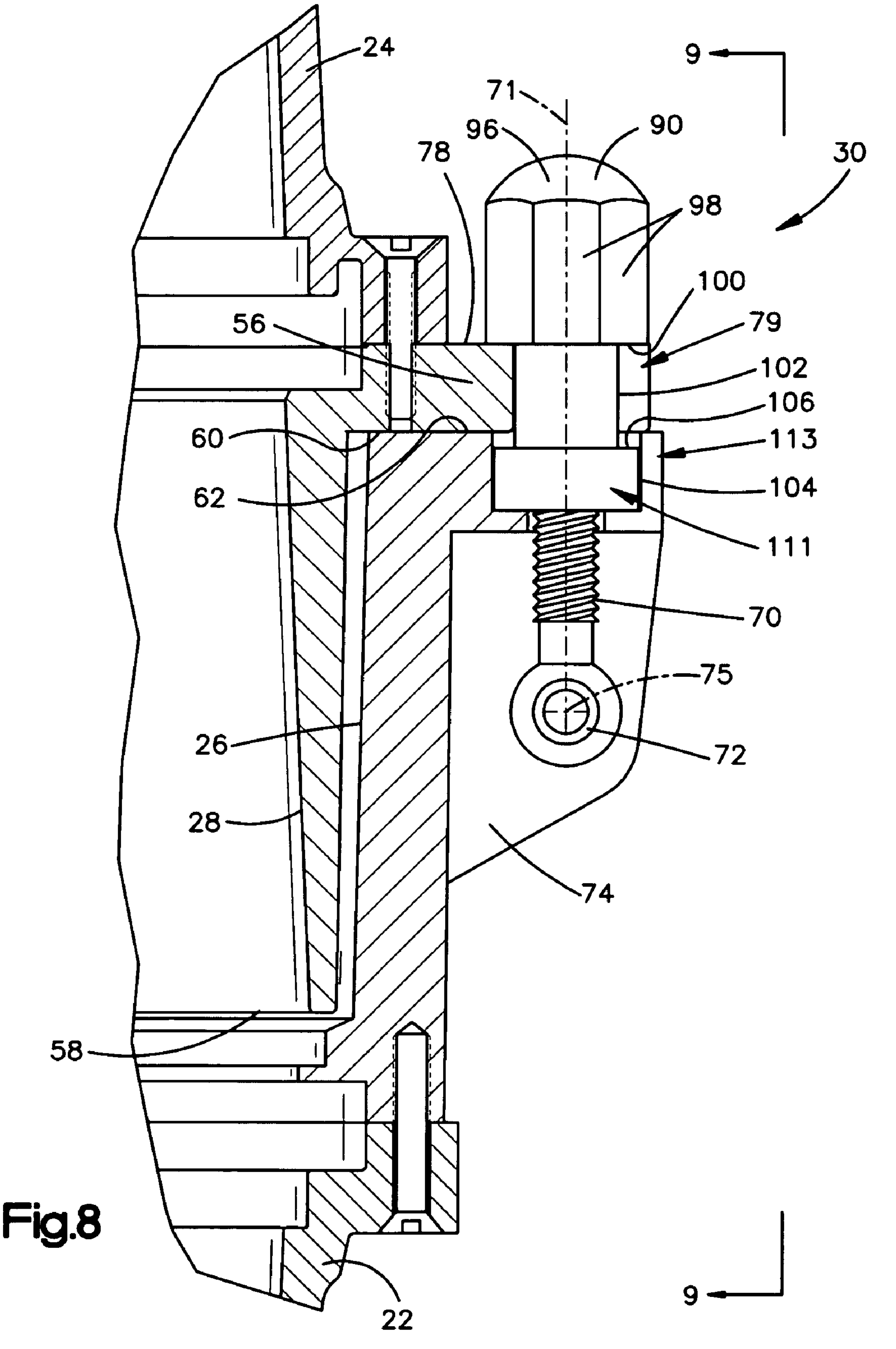
FIG. 8 is a view similar to FIG. 6, showing parts in different positions.
Figure 9:
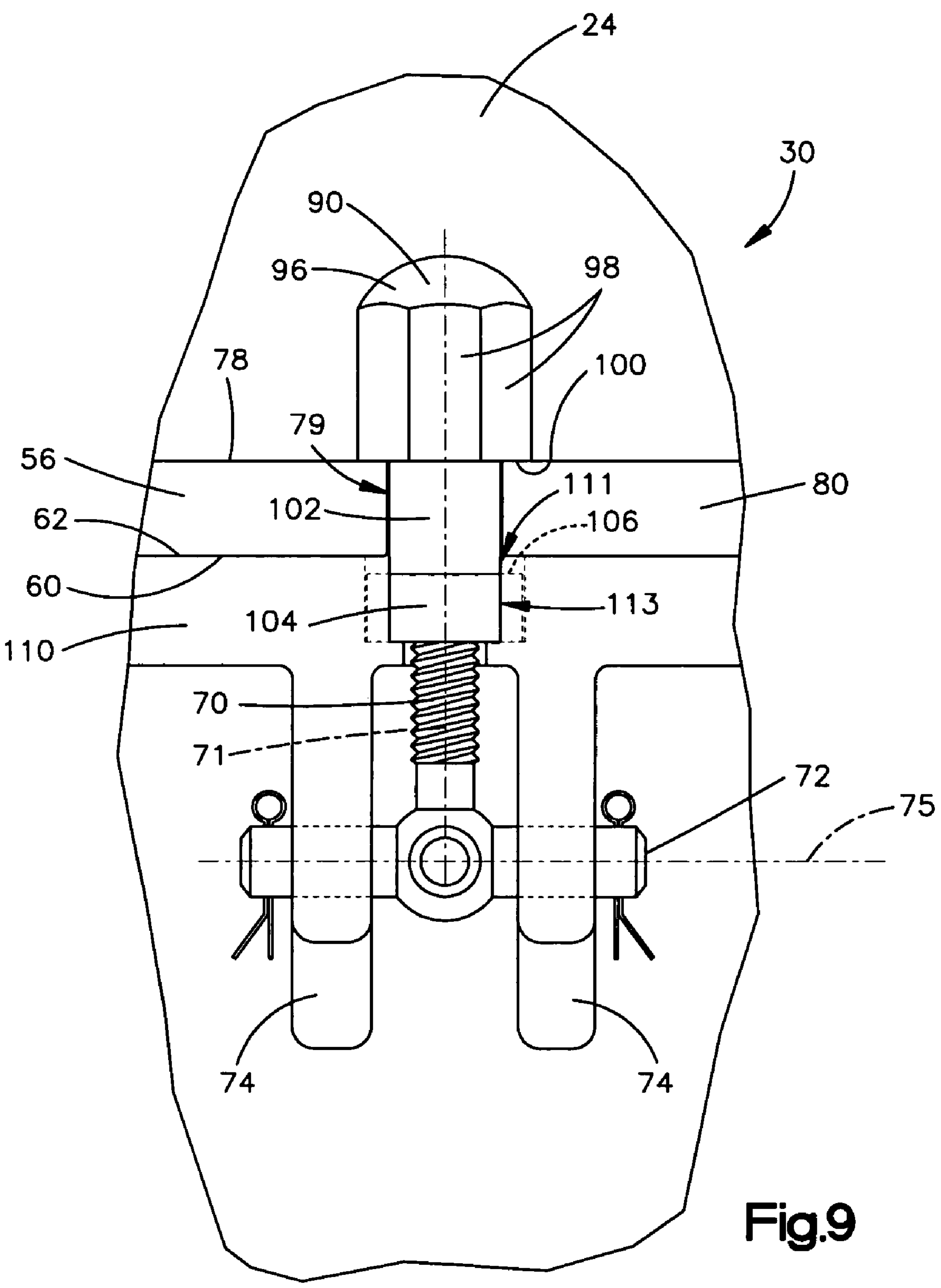
FIG. 9 is a view taken on line 9-9 of FIG. 8.

FIGS. 1 and 8-9 show the two shell halves 22 and 24 in their fully engaged positions. In use, the clamp assembly 30 is operative to move the shell halves 22 and 24 axially into and out of these positions. First, the user moves them telescopically into partially engaged positions, such as the positions in which they are shown in FIGS. 2 and 3-4. Next, with the nut 90 received only a short distance over the bolt 70, the user swings the bolt 70 pivotally around the axis 75 from the position of FIGS. 3-4 to the position of FIGS. 6-7. This moves the intermediate section 102 of the nut 90 into the slot 79 in the flange 56 on the second shell half 24. The flange 56 is then captured axially between the opposed shoulder surfaces 100 and 106 on the nut 90. The bolt 70 pivots through the slot 113 in the other flange 110. As noted above, the base portion 104 of the nut 90 is wider than the slot 113 and, therefore, can not move into the counterbore 111 through the slot 113. Instead, the base portion 104 of the nut 90 is moved into the space between the flanges 56 and 110, and is thus placed in a position from which it can be moved axially into the counterbore 111.

Figure 6:
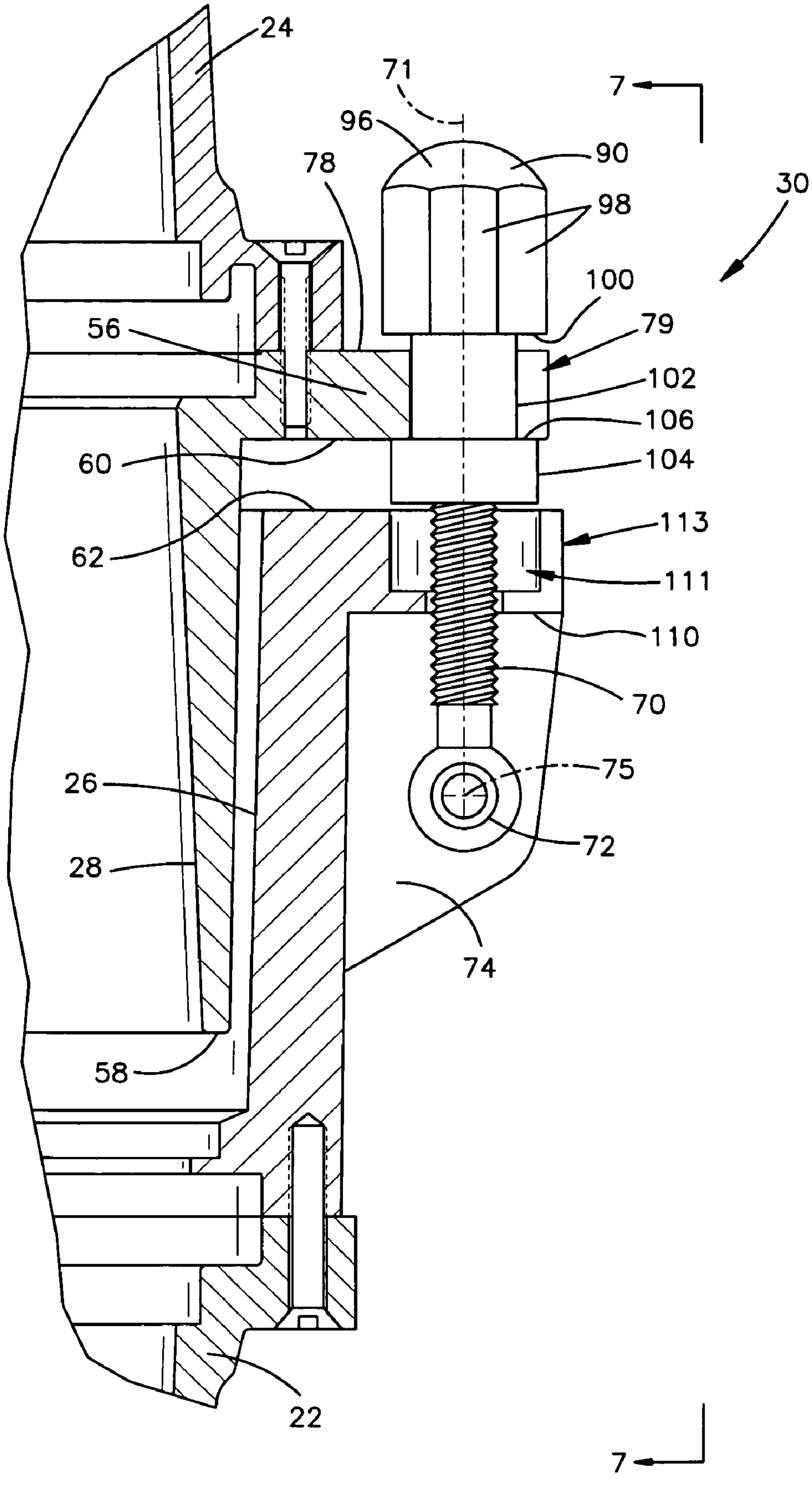
FIG. 6 is a view similar to FIG. 3, showing parts in different positions.

Having placed the nut 90 and the bolt 70 in the arrangement shown in FIGS. 6 and 7, with the bolt axis 71 parallel to the central axis 39, the user can screw the nut 90 farther onto the bolt 70 to move the nut 90 axially downward as viewed in the drawings. This causes the first shoulder surface 100 on the nut 90 to move into abutment with the opposed inner side surface 78 on the flange 56, and to press against that surface 78 so as to push the second shell half 24 axially toward the first shell half 22 as the nut 90 is advanced onto the bolt 70.

As the nut 90 moves the shell halves 22 and 24 toward and into the fully engaged positions shown in FIGS. 8 and 9, the base 104 of the nut 90 moves into the pocket defined by the counterbore 111. The base 104 then blocks the bolt 70 from moving pivotally outward through the adjacent slot 113 until the user later retracts the nut 90 along the bolt 70. Unscrewing the nut 90 causes the second shoulder surface 106 on the nut 90 to move into abutment with the opposed outer side surface 60 on the flange 56, and thereby to draw the second shell half 24 axially away from the first shell half 22. Importantly, unscrewing the nut 90 moves the shell halves 22 and 24 apart in a gradual manner that can provide a specified time delay, such as a delay of at least one second, between disengagement of the safety circuit contacts and subsequent disengagement of the power circuit contacts inside the shell halves 22 and 24. The depth of the counterbore 111 causes the nut 90 to block the bolt 70 from pivoting outward through the slot 113 until the safety circuit contacts have been disengaged. At that time, by swinging the nut 90 and bolt 70 pivotally back from the positions of FIGS. 6-7 toward the positions of FIGS. 3-4, the user can remove the plug 28 fully from the socket 26, and can separate the two shell halves 22 and 24 fully from each other, without removing the nut 90 from the bolt 70.

The patentable scope of the invention is defined by the claims, and may include other examples of how the invention can be made and used. In this regard the plug 28 and the socket 26 could be reversed relative to the clamp assembly 30. Such other examples, which may be available either before or after the application filing date, are intended to be within the scope of the claims if they have structural elements that do not differ from the literal language of the claims, or if they have equivalent structural elements with insubstantial differences from the literal language of the claims.

The invention claimed is:

1. An apparatus comprising:

an electrical cable coupler shell having first and second halves with open end portions configured for telescopic movement along an axis;

a first clamp structure on the first shell half;

a second clamp structure on the second shell half; and a third clamp structure receivable in screw-threaded engagement with the first clamp structure for movement axially and rotationally relative to the first shell half;

the third clamp structure being configured to engage the second clamp structure so as to rotate relative to the second shell half, and simultaneously to impart axial movement to the second shell half, upon moving axially and rotationally in screw-threaded engagement with the first clamp structure;

wherein the first clamp structure comprises a screw-threaded bolt mounted on the first shell half, and the third clamp structure comprises a nut that is receivable on the bold and movable axially against the second clamp structure upon rotating on the bolt; and further comprising a fourth clamp structure which is located on the first shell half, which defines a passage through which the bolt can extend in a direction parallel to the axis, and which defines a pocket configured to receive the nut upon axial movement of the nut on the bolt.

2. An apparatus as defined in claim 1 wherein the bolt is supported on the first shell half for movement pivotally into and out of the passage in the fourth clamp structure.

3. An apparatus as defined in claim 1 wherein the second clamp structure has a pair of abutment surfaces facing in opposite directions parallel to the axis, and the nut has a pair of opposed abutment surfaces, each of which is configured to press against a corresponding one of the abutment surfaces on the second fastener structure upon corresponding axial movement of the nut on the bolt.

4. An apparatus as defined in claim 1 wherein the second clamp structure has a passage through which the bolt is receivable to support the nut in axially abutting contact with the second clamp structure.

5. An apparatus as defined in claim 4 wherein the bold is supported on the first shell half for movement pivotally into and out of the passage in the second clamp structure.

6. An apparatus as defined in claim 1 wherein the open end portion of the first shell half is configured as a socket and the open end portion of the second shell half is configured as a plug.

7. An apparatus comprising:

an electrical cable coupler shell having first and second halves with open end portions configured for telescopic movement along an axis;

a screw threaded bolt mounted on the first shell half;

an abutment structure on the second shell half; and a nut that is screwed onto the bolt and configured to move against the abutment structure so as to move the second shell half axially relative to the first shell half upon moving along the bolt;

wherein the bolt is supported on the first shell half for movement pivotally into and out of a position parallel to the central axis, and the nut is movable on the bolt axially between an advanced position in which the nut blocks movement of the bold pivotally out of the parallel position and a retracted position in which the nut does not block movement of the bolt pivotally out of the parallel position; and further comprising a clamp structure which is located on the first shell half, which defines a passage through which the bolt extends when in the parallel position, and which defines a slot through which the bolt is movable pivotally into and out of the passage;

wherein the passage in the clamp structure includes a counterbore configured to receive the nut in the advanced position.

8. An apparatus as defined in claim 7 wherein the abutment structure has a pair of abutment surfaces facing in opposite directions parallel to the central axis, and the nut has a pair of opposed abutment surfaces, each of which is configured to press against a corresponding one of the abutment surfaces on the abutment structure upon corresponding axial movement of the nut on the bolt.

9. An apparatus as defined in claim 7 wherein the open end portion of the first shell half is configured as a socket and the open end portion of the second shell half is configured as a plug.

* * * * *